United States Patent [19]

Huffman et al.

[11] 4,105,299
[45] Aug. 8, 1978

[54] ELECTRO-OPTICAL DEVICES CONTAINING METHINE ARYLIDENE DYES

[75] Inventors: William A. Huffman, Minneapolis; Harvey A. Brown, Lake Elmo, both of Minn.

[73] Assignee: Minnesota Mining and Manufacturing Company, Saint Paul, Minn.

[21] Appl. No.: 786,488

[22] Filed: Apr. 11, 1977

[51] Int. Cl.² .......................... G02F 1/13; C09K 3/34
[52] U.S. Cl. .................................... 350/349; 252/299; 252/408
[58] Field of Search ......................... 252/299, 408 LC; 350/160 LC, 160 R

[56] References Cited

U.S. PATENT DOCUMENTS

| | | | |
|---|---|---|---|
| 2,400,877 | 5/1946 | Dreyer | 252/299 |
| 2,544,659 | 3/1951 | Dreyer | 252/299 |
| 3,597,044 | 8/1971 | Castellano | 252/299 |
| 3,703,329 | 11/1972 | Castellano | 252/299 |
| 3,833,287 | 9/1974 | Taylor et al. | 252/299 |
| 3,960,750 | 6/1976 | Moriyama et al. | 252/299 |
| 3,960,751 | 6/1976 | Moriyama et al. | 252/299 |
| 3,963,314 | 6/1976 | Yamashita | 350/160 R |
| 4,003,633 | 1/1977 | Yamashita | 252/299 |
| 4,032,219 | 6/1977 | Constant et al. | 252/299 |
| 4,032,470 | 6/1977 | Bloom et al. | 252/299 |
| 4,033,948 | 7/1977 | Brown | 260/240 A |

FOREIGN PATENT DOCUMENTS 2,627,215  1/1977  Fed. Rep. of Germany .......... 252/299

OTHER PUBLICATIONS

White; D. L. et al., J. Appl. Physics, vol. 45, No. 11, pp. 4718-4723 (1974).
Uchida; T. et al., Electonics Comm. Jap., vol. 59-c, No. 3, pp. 107-115 (1976).
Uchita; T. et al., Mol. Cryst. Liq. Cryst. (Lett), vol. 34, pp. 153-158 (1977).
Uchita; T. et al., Mol. Cryst. Liq. Cryst., vol. 39, pp. 39-52 (1977).
Morita; M. et al., Jap. J. Appl. Phys., vol. 14, No. 2, pp. 315-316 (1975).
Bloom; A. et al., Mol. Cryst. Liq. Cryst., vol. 40, pp. 210-221 (1977).

Primary Examiner—Benjamin R. Padgett
Assistant Examiner—T. S. Gron
Attorney, Agent, or Firm—Cruzan Alexander; Donald M. Sell; Temple Clayton

[57] ABSTRACT

Methine 4-nitro-arylidene dyes having certain substituents in the 2 position of the arylidene group are found to be pleochroic and to form guest-host combinations with dielectrically positive anisotropic nematic liquid crystals. These combinations are employed in electro-optical display devices.

2 Claims, 11 Drawing Figures

ELECTRO-OPTICAL DEVICES CONTAINING METHINE ARYLIDENE DYES

This invention relates to pleochroic methine 4-nitroarylidene dyes in guest-host combinations with dielectrically positive nematic liquid crystals. This invention further relates to electro-optical devices employing the said guest-host combinations.

Electro-optical devices in which liquid crystals are employed usually comprise two transparent flat plates having very thin transparent electrodes on their inwardly facing surfaces, separated by from a few microns to a few tens of microns and with a liquid crystalline composition filling the space between the plates. It is these plates which are referred to below as walls of the vessel. Impressing an electric or magnetic field on the liquid crystal affects the optical properties of the layer of liquid crystal.

It was discovered by Heilmeier and Zanoni, Applied Physics Letters, Vol. 13, page 91–92 (1968) that, when pleochroic dyes are combined with nematic liquid crystals in a device such as above, the pleochroic colors of the dye are manifested as an electric field is applied and released. The nematic liquid is referred to as the "host" and the pleochroic dye as the "guest" so that the composition is referred to as a guest-host combination. The phenomenon has been utilized in U.S. Pat. Nos. 3,551,026, 3,597,044 and 3,960,751 to produce electro-optical devices.

U.S. Pat. No. 3,551,026 employs substances, e.g., p-n-butoxybenzoic acid and butyl anisylidene amino cinnamate, which become nematic at relatively elevated temperatures and the device used therefore provides for heating although not requiring it. Methyl red and indophenol blue are used as pleochroic dyes.

U.S. Pat. No. 3,597,044 employs p-n-acyloxybenzylidene-p'-aminobenzonitriles as nematic liquid crystals with various pleochroic dyes and particularly combinations of nematic liquid crystals which then have depressed crystalnematic transition temperatures just above room temperature and may remain supercooled at room temperature.

U.S. Pat. No. 3,960,751 employs nematic liquid crystals having positive and negative dielectric anisotropy separately or together in different examples with novel pleochroic 1,4- and 1,8-bis(monoalkyl amino)anthraquinones either alone or in combination with other pleochroic azo dyes.

In order for an electro-optical device employing nematic liquid crytals to be operable the liquid crystal must have an oriented structure which is controlled by the direction of an applied electric field. Liquid crystals (mesomorphic substances) tend to have rod-like molecules. When the long axes of the liquid crystals are perpendicular to the walls of the cell or vessel the structure is termed homeotropic. When the long axes of the liquid are parallel to the walls of the cell or vessel the structure is termed homogeneous because of the homogeneous boundary conditions. When two homogeneously orienting walls are at right angles of lines of orientation a twisted nematic liquid crystalline structure is achieved. This can be altered to a cholesteric phase by addition of a soluble optically active nematic liquid crystalline material such as:

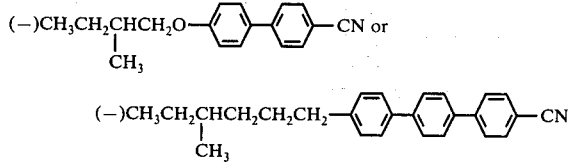

wherein the alkyl groups are active amyl and active heptyl. In such cases it is the axis of the helix of the cholesteric phase which is homeotropically or homogeneously oriented.

Homogeneous boundary conditions may be achieved by several techniques each of which offers advantages for certain purposes. These are well known in the art and do not need to be described in detail. Suitable techniques and references showing the procedure include:

1. rubbing, e.g. with aqueous suspension of very fine zirconium oxide in a single direction, cf. F. J. Kahn "Nematic Liquid Crystal Device" U.S. Pat. No. 3,694,053;
2. mechanical surface scribing or deformation, cf. D. W. Berrgman, Phys. Rev. Lett., Vol. 28, p. 1683 (1972);
3. deposition of organic materials, such as trimethoxysilane, R—Si(OCH$_3$) followed by rubbing as above, cf. F. J. Kahn, Appl. Phys. Lett., Vol. 22, p. 11 (2/1/73) and idem, Appl. Phys. Lett., Vol. 22, p. 386 (4/15/73)
4. deposition of inorganic materials such as metal oxides or MgF$_2$, vapor deposited at angles of 1°–30° to the coated surface, cf. J. L. Janning, Appl. Phys. Lett., Vol. 21, p. 173 (1972) or deposition at angles above 30° followed by rubbing.

Homeotropic boundary conditions, which are generally of less interest, are attained, for example, by coating with metal oxides at angles well above 30° or treatment with surfactants.

Positive anisotropy is exhibited by liquid crystals which tend to align longitudinally with an impressed field. Such compounds are of particular significance for guest-host combinations of the invention. It is usually only necessary that the overall effect is that of dielectrically positive anisotropy so that the liquid crystalline host may be composed of high percentages of dielectrically negative anisotropic materials with smaller amounts of highly dielectrically positive anisotropic materials.

Many pleochroic dyes which are useful in guest-host combinations also tend to have elongated molecules with little or no absorption along their long axis and absorption of light in various portions of the visible spectrum along the short axis. Other pleochroic dyes may align oppositely being colorless on the short and colored along the long axis.

These are of two types when combined with nematic liquid crystal having a homeotropic structure, i.e. molecules perpendicular to walls of vessel, the first above type of pleochroic dye then aligns its rods with those of the host liquid crystal and no color is seen until an electric field is imposed. Correspondingly, when the same pleochroic dye is combined with a nematic liquid crystal having the twisted structure, the molecules are aligned parallel to the walls of the vessel and progressively at right angles and the combination appears colored until an electric field is applied.

By combining two pleochroic dyes, one each of the above two types, devices which change from one color to another are evidently possible. A further effect is obtained by incorporating an isotropic dyestuff with a pleochroic dyestuff so that the colors of the two are additive at one stage and the isotropic dyestuff appears at the other stage of cycling the electric field.

In order that there be a cycle between colorless and colored or between two colors for a given device it is obviously imperative to employ the dye in amounts which are alignable by the nematic liquid crystal, i.e., not in excess of the proportions which are within the capabilities of alignment by the amount of liquid crystal present. This is usually found to be up to about 5% by weight. In some cases the solubility of the pleochroic dye is inadequate to achieve concentrations above about 1–5% by weight. Combinations of the prior art are capable of achieving contrasts from zero to maximum electric field of about 2:1 up to about 4:1. It would be desirable to have greater solubilities and higher contrasts and these are therefore aims and objects of the inventions.

It has been found that methine 4-nitro-arylidene dyes having certain substituents, particularly CN, in the 2 position of the arylidene group are pleochroic and usefully compatible with nematic liquid crystals. The 4-nitroarylidene dyes having the general formula:

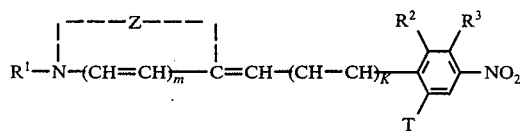

wherein:
Z represents the atoms necessary to complete a mono- or polycyclic dihydroheterocyclic nucleus having 5 to 6 atoms in the ring including the N of the formula and preferred arylidene dye bases which are acutance agents include these in which Z is —CH=CH—, —CH=CH—CH=CH—,

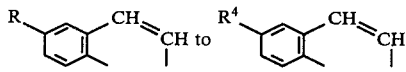

where
$R^4$ is H, alkyl or alkoxy of 1–2 carbon atoms,
$R^1$ is an alkyl, substituted alkyl, alkenyl, or aryl group;
$m$ is 0 or 1;
$k$ is 0, 1 or 2;
T is selected from $CF_3$ or CN and $R^2$ and $R^3$ are hydrogen, or together constitute a condensed carbocyclic aromatic ring.

Particularly useful guest-host combinations are formed, for example, with typical dielectrically positive anisotropic nematic compounds or compositions such as N-p-hexylbenzylidene-p'-aminobenzonitrile or 4-cyano-4'-heptylbiphenyl or compositions including these compounds in dominating amounts, i.e., providing net dielectrically positive anisotropy. It will be understood herein that positive anisotropy refers to dielectrically positive anisotropy.

The methine 4-nitroarylidene dyes can be employed at up to equimolar properties with the nematic compounds to obtain contrast ratios up to at least 10:1. The combinations are particularly valuable because they provide colors not generally available heretofore in guest-host combinations, e.g., magenta and cyan.

Many of these 4-nitroarylidene dyes are further remarkable in providing exceptionally high values of the optical order parameter S particularly when there is included a polymethine chain. This parameter is a measure of the efficiency of orientation of a dye. It is determined by measuring absorption of light as the reciprocal of percent transmission at $\lambda_{max}$ through a liquid crystal solution of the dye between electrode-coated plates in a cell as described above with and without an impressed field. Where $A_1$ and $A_0$ are the absorption with and without field respectively, $$S = \frac{A_0 - A_1}{A_0 + 2A_1}$$

The parameter S is given as a decimal number less than 1. Pleochroic dyes of the prior art provided values of S of the order of about 0.3 to 0.5. Many of the present 4-nitro-arylidene dyes give optical order parameters of 0.5 and higher and in preferred compounds are 0.7 and higher. These compounds further provide colors not readily available heretofore in guest-host combinations. The 4-nitroarylidene dyes therefor provide an unexpectedly high range of values of S not to be expected from any prior art teachings.

The unusual properties of the instant pleochroic guest-host combinations render them of value in electro-optical display devices, such as for calculators, watches, etc. and also for use as electronic shutters for devices such as cameras, projectors and by use in a specular arrangement they assist in providing mirrors which can pass from specular to transparent and can be employed in cameras or wherever mirrors are used.

Reference is now made to the several drawings herewith wherein

Figure 4:
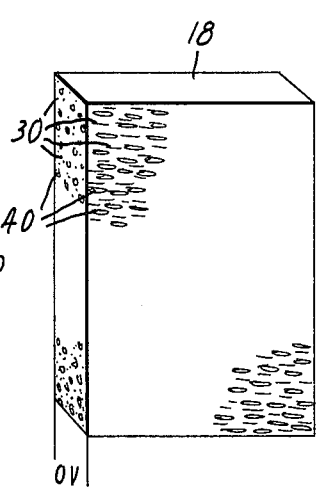
FIGS. 4 and 5 show combinations in guest-host relationship of homogeneous positive anisotropic nematic liquid crystals and dyes of the invention without and with impressed voltage respectively.
Figure 5:
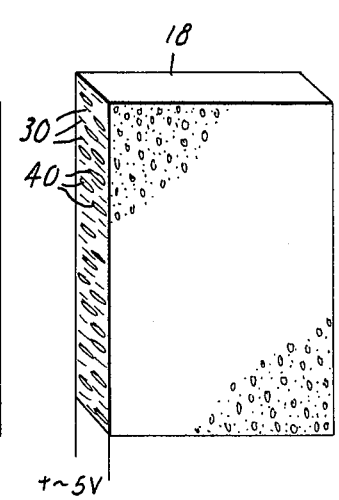
Figure 6:
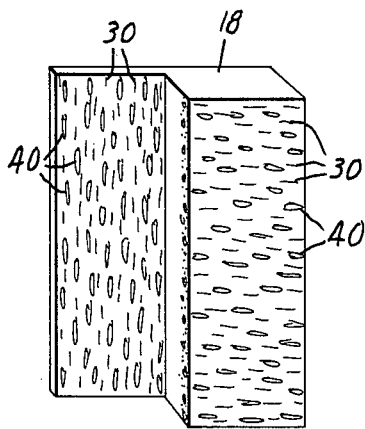
Figure 7:
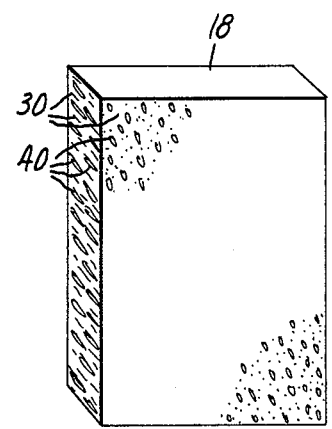
Figure 8:
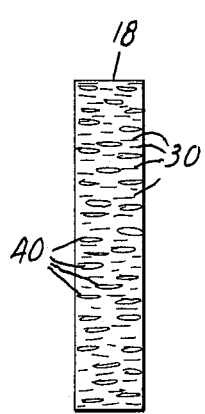

FIGS. 6, 7 and 8 show combinations of FIGS. 4 and 5 but with orientation of walls of cell at right angles giving twisted nematic liquid crystals. FIG. 6 is without and FIGS. 7 and 8 with impressed voltage.

Figure 2:
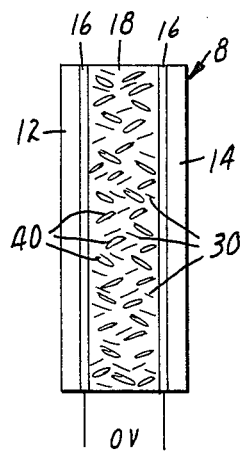
FIG. 2 shows in diagrammatic fashion a homeotropic guest-host combination of the invention with no impressed voltage.
Figure 3:
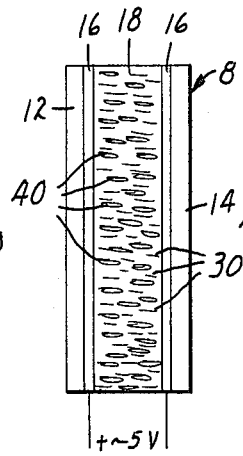
FIG. 3 shows the homeotropic guest-host combination of FIG. 2 with impressed voltage.
Figure 9:
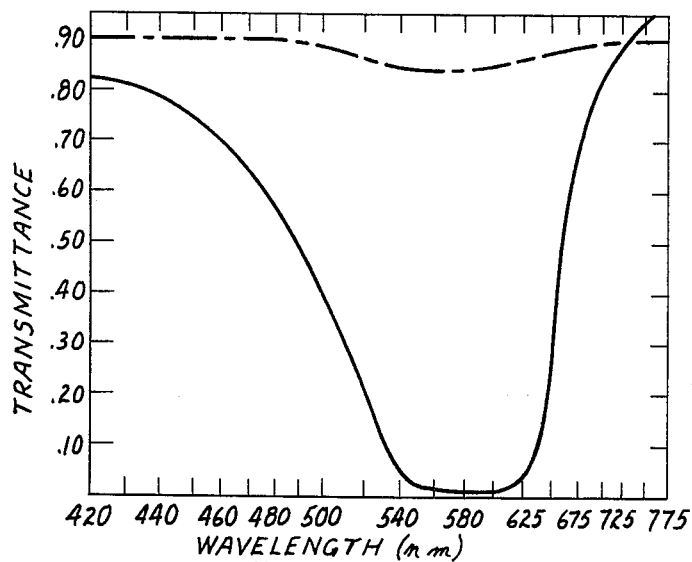

FIG. 9 shows transmittance curves of a 5% solution of 4-(2-cyano-4-nitrobenzylidene)-1-methyl-1,4-dihydroquinoline dissolved in positive nematic liquid crystal (4-cyano-4'-n-pentyl-biphenyl) with and without impressed voltage as in FIGS. 2 and 3, etc.

Figure 10:
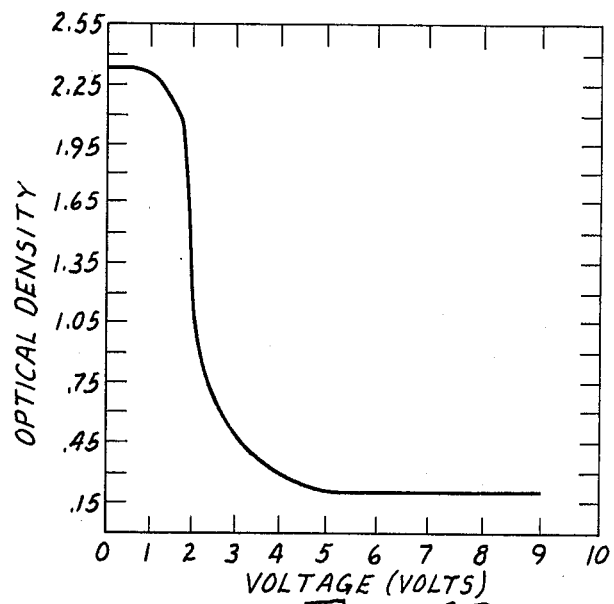

FIG. 10 shows decrease in optical density (ordinates) with increasing impressed voltage (abscissae) for the system of 5% of 4-(2-cyano-4-nitrobenzylidene)-1-methyl-1,4-dihydroquinoline in N-p-hexylbenzylidene-p'-aminobenzonitrile.

Figure 11:
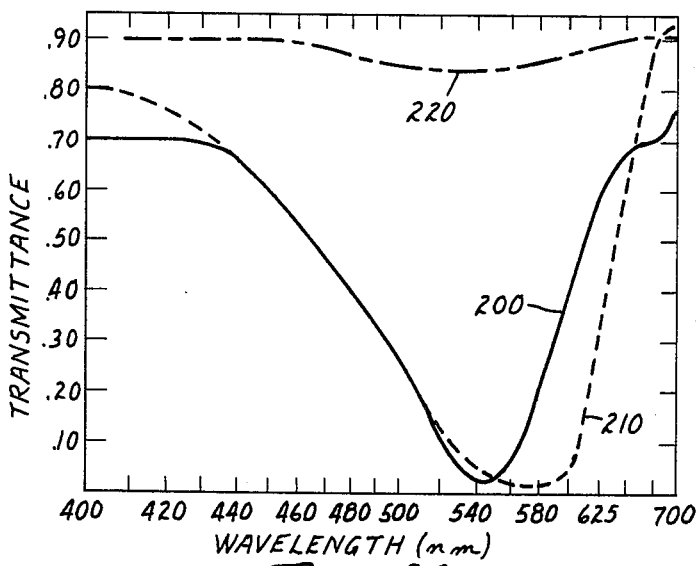

FIG. 11 shows a system comprising a non-pleochroic dye together with a pleochroic 4-nitro arylidene dye in positive anisotropic nematic liquid crystal.

Figure 1:
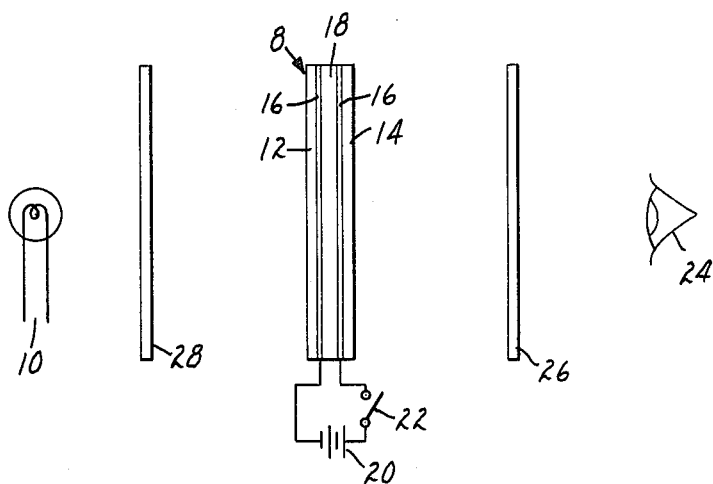
FIG. 1 shows diagrammatically an electro-optical valve device employing guest-host combinations of pleochroic dyes of the invention.

In FIG. 1 a cell 8 is shown having wall 12 and 14 inwardly coated with conductive coatings of tin and/or indium oxide 16 and containing guest-host combination 18 of positive anisotropic nematic liquid crystal and pleochroic dye (not indicated in this figure). Cell 8 is placed between light source 10 and observer 24 with polarizer 28 and, for certain uses, analyzer 26. Cell 8 is provided with a source of direct current 20 shown as a battery but any source is the equivalent thereof. The source of current is connected to coatings 16 of the cell with switch 22 interposed.

FIGS. 2 and 3 show an enlarged view of the end of cell 8 with diagrammatic representation of the molecules of nematic liquid crystalline material 30 and dissolved pleochroic dye 40. The cell walls of FIGS. 2 and 3 have been treated as described above so that homeotropic orientation occurs when a voltage is applied as indicated in FIG. 3 and molecules 30 and 40 tend to orient at right angles to the walls as shown.

The cell of FIGS. 4 and 5 is shown in facial view. The inner cell walls have been oriented in parallel arrangement as described herein suitable by coating with MgF$_2$ at a low angle over the tin and/or indium oxide. The orientation of FIG. 4 with 0 impressed voltage is changed by an applied voltage of about 2 volts and molecules 30 and 40 align with the field.

FIGS. 6, 7 and 8 shows the behavior in a cell with twisted orientation. The cell walls are as for FIGS. 4 and 5 but with orientation at right angles. In FIG. 6 there is orientation in a vertical direction at the rearward wall and horizontally at the forward wall with no impressed voltage. When a voltage is impressed as in FIGS. 7 and 8 it is seen that molecules are oriented with the field. In FIG. 6 a portion of cell and contents are cut away to show orientation on the rearward wall.

FIG. 9 shows transmittance curves of a cell as shown in above Figures containing a guest-host combination of the invention as described below in Example 2. The upper curve is with impressed voltage.

FIG. 10 shows change of optical density (ordinates) with increasing voltage (abscissae) for a solution of 4-(2-cyano-4-nitrobenzylidene)-1-methyl-1,4-dihydroquinoline in N-p-hexylbenzylidene-p'-aminobenzonitrile. It is seen that there is about 15-fold increase in transmission from 1 to 5 volts applied.

FIG. 11 shows a system comprising 5% of a non-pleochroic dye, 1-(2',4',6'-tribromophenyl)-3-phenylacetamido-5-pyrazolone and 5% of 4-(2-cyano-4-nitrobenzylidene)-1-methyl-1,4-dihydroquinoline in N-p-hexylbenzylidene-p'-aminobenzonitrile showing transmittance with and without impressed voltage of the non-pleochroic pyrazolone dye alone 200 and with 210 and without 220 impressed voltage for the combined system. With no impressed voltage the color appears to be a shade of green and with voltage a shade of red.

As indicated above it is necessary in forming guest-host combinations of the invention to employ positive anisotropic nematic compounds or compositions. Included in typical compounds with positive anisotropy are the following with temperature at which conversion of crystalline to nematic state (C→N) and nematic to isotropic state (N→I) occurs:

Table 1

|  | C→N | N→I |
| --- | --- | --- |
| N-p-n-Hexylbenzylidene-p'-aminobenzonitrile | — | 51.5–52.5 |
| N-p-[(p-methoxybenzylidene)-amino]benzonitrile | 105 | 125 |

Table 1-continued

|  | C→N | N→I |
| --- | --- | --- |
| N-p-[(ethoxybenzylidene)-amino]benzonitrile | 106 | 118 |
| N-p-cyanobenzylidene-p'-n-butoxyaniline | 70 | 93 |
| N-p-cyanobenzylidene-p'-octyloxyaniline | 83* | 107 |

*Smectic to nematic transition

Other useful positive anisotropic nematic liquid crystals are included in compounds

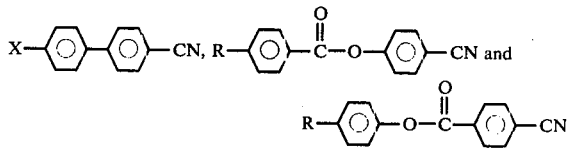

wherein R = alkyl or alkoxy of 1–7 carbon and X is alkyl or alkoxy of 1–9 carbon atoms.

Eutectic mixtures and combinations of all the above are also useful. Illustrative eutectic mixtures of 4'-substituted 4-cyano-4'-alkyl biphenyl are included in Table 2.

Table 2

| 4'sub | comp (Mol) | °C C→N | °C N→I |
| --- | --- | --- | --- |
| nC$_5$H$_{11}$ | 59 | | |
| nC$_7$H$_{15}$ | 41 | 3 | 37.5 |
| nC$_5$H$_{11}$ | 55 | | |
| nC$_5$H$_{11}$O | 15 | | |
| nC$_7$H$_{15}$O | 13 | 0 | 57.5 |
| nC$_8$H$_{17}$O | 17 | | |
| nC$_7$H$_{17}$ | 36 | | |
| nC$_3$H$_7$O | 18 | | |
| nC$_5$H$_{11}$O | 15 | 0 | 61 |
| nC$_7$H$_{15}$O | 12 | | |
| nC$_8$H$_{17}$O | 12 | | |

The above compounds with positive anisotropy can be employed with compounds such as the representative species of several useful groups of nematic liquid crystals with negative anisotropy shown in Table 3.

Table 3

|  | °C C→N | °C N→i |
| --- | --- | --- |
| N-p-methoxybenzylidene-p'-n-butylaniline | 19 | 45 |
| p-[N-(p-methoxybenzylidene)-amino]-phenylbenzoate | 120 | 166 |
| N-p-methoxybenzylidene-p'-aminophenylacetate | 79 | 102 |
| p-azoxyanisole | 119 | 133 |
| p-n-butylbenzoic acid p'-n-hexyloxyphenyl ester | 56 | 87 |
| butyl p-(p'-ethoxyphenoxycarbonyl)phenyl-carbonate | 73 | 127 |
| p(p'-ethoxyphenylazo)phenyl heptanoate | 73 | 127 |
| p(p'-ethoxyphenylazo)phenyl undecylenate | 64 | 107 |
| p-methoxybenzylidene-p'-butylaniline | 20 | 44.5 |
| N-(p-butyoxybenzylidine)-p'-pentylaniline | 41 | 80 |
| p-ethoxybenzylidene-p'-n-butylaniline | 38 | 78–9 |

Some groups of included compounds are

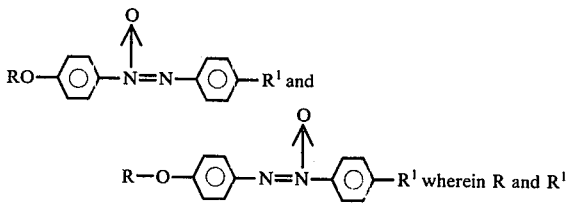

wherein R and R$^1$ wherein R and R¹ are lower alkyl of $C_1$-$C_4$:

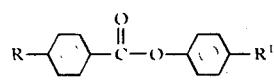

wherein R is alkyl of $C_1$-$C_7$ and R¹ is alkoxy of $C_1$-$C_7$ or wherein R is alkoxy of $C_1$-$C_7$ and R¹ is alkyl $C_1$-$C_7$:

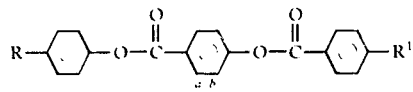

wherein R and R¹ are alkyl of $C_1$-$C_7$ and a or b are H or one can be Cl.

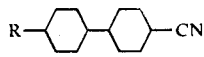

wherein R is alkyl or alkoxy of 1 to 10 carbon atoms and eutectic mixtures of such compounds.

When combined nematic compounds of Table 3 are with those of Tables 1 or 2 the combinations must have a net positive anisotropy. This may be achieved using only relatively low percentages of materials with high positive anisotropy when the other materials have relatively low negative anisotropy. Such combinations include, for example, A and B shown in Table 4 as percentages. Both are nematic at least from −10° C to +50° C.

Table 4

|  | A | B |
|---|---|---|
| N-p-methoxybenzylidene-p'-n-butylaniline | 57.3 | 51 |
| N-p-ethoxybenzylidene-p'-n-butylaniline and | 32.7 | 29 |
| N-p-hexylbenzylidene-p'-aminobenzonitrile. | 10.0 | 20 |

The 4-nitroarylidene dyes used in the present combinations are prepared by methods similar to the generally known methods for preparation of odd-numbered methine cyanine dye bases such as are described in, among other references, Chapter XI, *Cyanine Dyes and Related Compounds* by Hamer, Interscience Publishers (1964), and are fully disclosed and claimed in the copending application of one of us Ser. No. 687,003 filed May 17, 1976, now U.S. Pat. No. 4,033,948, the disclosure of which in regard to preparation methods and examples is herein incorporated by reference.

In order to determine the optical order parameter a cell is constructed to provide orientation of a host nematic medium. Two glass plates 5 mm thick and about 5×7 cm are cleaned thoroughly by washing successively in acid, alcohol aqueous ammonia and distilled water and dried at 65° C in an oven. Each plate is then coated on one surface by vapor deposition of indium oxide which makes the surface electrically conductive. The indium oxide surfaces are oriented, i.e. rendered anisotropic, by unidirectional rubbing under slight moderate pressure for about 20 strokes with a cotton pad impregnated with an aqueous suspension of zirconium oxide. Each plate is carefully rinsed with distilled water, placed on edge in an oven and dried for one hour at 65° C. Two strips of polytetrafluoroethylene sheets about 12 μ thick are cut about 5 cm long and applied to the oriented surface of one plate at a distance of about 5 cm and the other plate applied with orientation directions of the two plates at right angles. The assembly is then fastened together.

A solution of the pleochroic dye to be tested is prepared by warming about 0.5 g of the nematic combination of Table 4 to 65° C (i.e., above the isotropic melting temperature) and dissolving about 50 mg of the dyestuff therein. This should provide an optical density of approximately 2 at 655 nm. With the solution still above the isotropic melting point one edge of the cell is applied to the dyestuff solution which is drawn up to fill the cell by capillary action. After cooling for a period of time the temperature of the solution drops below the isotropic point into the nematic region and testing can continue.

Electrical contacts are made to the indium oxide coatings on the exposed ends of the glass plates forming the cell using alligator clips and these are connected to a switching circuit including a source of low voltage direct current capable of providing 50-100 microamperes over the range of 0.8 to 10 volts or of sufficiently high fixed voltage. The cell is then placed in the sample beam of a spectrophotometer (such as Perkin Elmer Model 350) having polarizing filters in both reference and sample beams and parallelly arranged analyzers. The filters give a neutral gray color when crossed. The transmittance is scanned over the range of 400-750 nm. and recorded graphically with no voltage applied to the cell (switch off) and with a voltage exceeding the threshold for the particular host (switch on). The resulting graphs generally resemble those shown in FIG. 9 in which the lower curve represents excellent transmittance (low absorption) at the peak at about 560 to 625 nm with no impressed voltage, and substantially complete absorption with impressed voltage.

A similar device is conveniently employed as an electrically controlled shutter for a camera using concentrations of the dyestuff sufficient to give substantially complete exclusion of light and substantial transparency with changing electrical field. A sequence of two of complementary colors may be employed to give more complete exclusion of light, if desired.

Examples of methine 4-nitroarylidene dyes available through the above application and used in guest-host combinations of the present invention include the Examples shown in the following Table 5 for each of which the approximate color is given (M=magenta, C=cyan) as well as the optical order parameter, S:

Table 5

1. 4-(2-cyano-4-nitrobenzylidene)-1-methyl-1,4-dihydroquinoline; M, S=0.33.
2. 4-(2-trifluoromethyl-4-nitrobenzylidene)-1-methyl-1,4-dihydroquinoline; M, S=0.26.
3. 2-(2-cyano-4-nitrobenzylidene)-1-ethyl-1,2-dihydroquinoline; M, S=0.55.
4. 2-(2-cyano-4-nitrobenzylidene)-1-methyl-6-ethoxy-1,4-dihydroquinoline; M, S=0.35.
5. 2-(2-cyano-4-nitrobenzylidene)-1-ethylbenzothiazoline; M, S=0.48.
6. 4-(2-cyano-4-nitrobenzylidene)-1-(2-nitrobenzyl)-1,4-dihydropyridine; M, S=0.58.
7. 2-[3-(2-cyano-4-nitrophenyl)allylidene]-1-methyl-1,2-dihydroquinoline; C, S=0.75.
8. 2-[3-(2-cyano-4-nitrophenyl)allylidene]-1-ethyl-1,2-dihydroquinoline; C, S=0.60.
9. 4-[3-(2-cyano-4-nitrophenyl)allilidene]-1-methyl-1,2-dihydroquinoline; C, S=0.69.

10. 2-[3-(2-cyano-4-nitrophenyl)allylidene]-1-ethyl-benzothiazoline; C, S = 0.58.

EXAMPLE 11

A reflecting electro-optical cell is made by filling an electric field cell with composition which is nematic with high positive anisotropy at ambient temperatures, a means of eliminating the necessity for an external polarizer and a dye with very high optical order parameter and suitable means for providing the desired surface boundary conditions such as surfaces coated at a low angle with $MgF_2$ as described above.

A suitable combination is a mixture of equal parts by weight of N-p-butyoxy-, N-p-hexyloxy-, and N-p-octanoyloxy- benzylidineaminobenzonitriles to which is added 5-10% by weight of an optically active nematic material such as the active amyl ester of cyanobenzylideneaminocinnamic acid. This addition provides a cholesteric host material, and enables the dye to efficiently absorb both polarizations of light in the relaxed state. In an applied field the cholesteric host undergoes a phase transition into a nematic state with homeotropic alignment. In this state the dye molecules are aligned parallel to the incident light and are not absorbing.

What is claimed is:

1. In an electro-optical device wherein an electrical field is imposed or withdrawn from action on a cell comprising liquid crystalline material having dissolved therein a pleochroic dye between transparent-electrode coated glass plates the improvement wherein the liquid crystalling material has net positive dieelectric anissotropy and comprises at least one nematic liquid crystalline having positive dielectric anisotropy and the dissolved pleochroic dye has the general formula

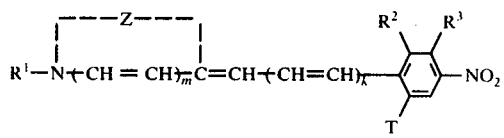

wherein:
Z represents the atoms necessary to complete a mono- or polycyclic dihydroheterocyclic nucleus having 5 to 6 atoms in the ring including the N of the formula where $R^1$ is an alkyl, substituted alkyl, alkenyl, or aryl group;
$m$ is 0 or 1;
$k$ is 0, 1 or 2;
T is selected from $CF_3$ or CN and $R^2$ and $R^3$ are hydrogen or together constitute a condensed carbocyclic aromatic ring.

2. An electro-optical device according to claim 1 wherein the Z of the pleochroic dye is —CH=CH—, —CH=CH—CH=CH—,

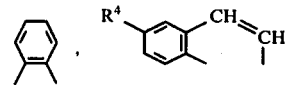

and $R^4$ is H, alkyl or alkoxy of 1-2 carbon atoms.

* * * * *

UNITED STATES PATENT AND TRADEMARK OFFICE
CERTIFICATE OF CORRECTION

PATENT NO. : 4,105,299
DATED : August 8, 1978
INVENTOR(S) : William A. Huffman and Harvey A. Brown It is certified that error appears in the above-identified patent and that said Letters Patent are hereby corrected as shown below:

Column 3, line 45, delete -- 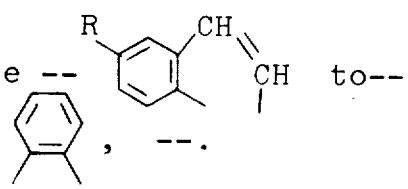 to-- and replace with --  , --.

Column 6, line 66, delete --wherein R and $R^1$--.

Signed and Sealed this

Sixth Day of March 1979

[SEAL]

Attest:

RUTH C. MASON
Attesting Officer

DONALD W. BANNER
Commissioner of Patents and Trademarks